United States Patent Office

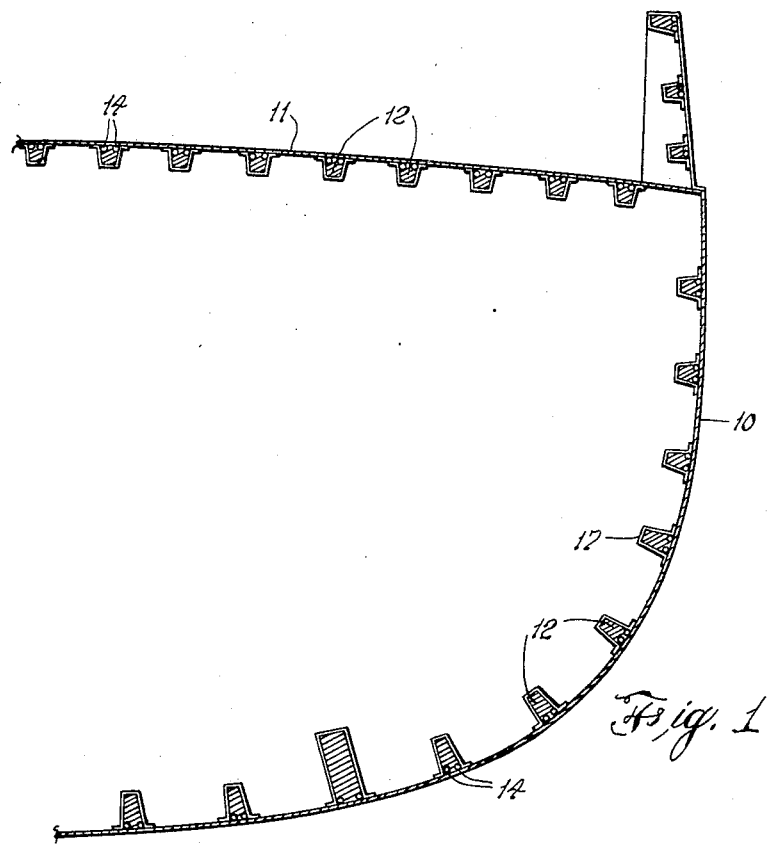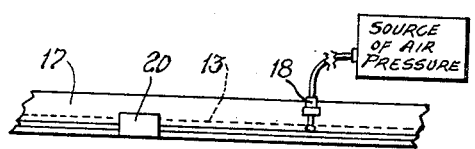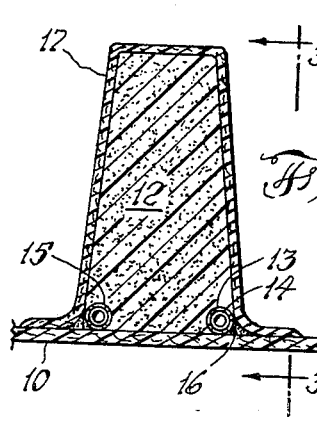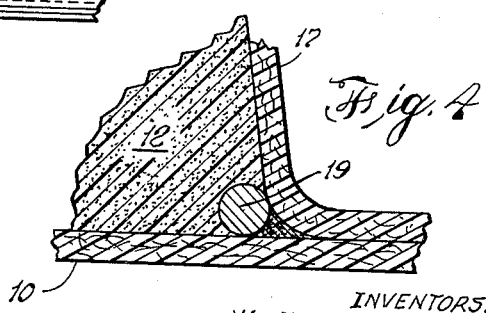

3,490,268
Patented Jan. 20, 1970

3,490,268
NONDESTRUCTIVE TESTING OF HULL STIFFENERS
Walter Hand, West Hempstead, and Maurice Silvergleit and Nathan Fried, Brooklyn, N.Y., assignors to the United States of America as represented by the Secretary of the Navy
Filed Jan. 22, 1968, Ser. No. 699,725
Int. Cl. G01m 3/04
U.S. Cl. 73—40          6 Claims

ABSTRACT OF THE DISCLOSURE

In the construction of glass reinforced plastic ship hulls, "hat" shaped longitudinal stiffeners are bonded thereto to provide necessary rigidity. These stiffeners are formed about lightweight foam cores and perforated tubes are inserted at the internal contacts between the stiffener and the hull. The tubes extend lengthwise along the stiffener and are provided at their ends with connectors and valves. The tubes are pressurized and any escaping fluid can be readily detected so as to indicate a poor or defective bond between the stiffener and the hull.

---

The invention described herein may be manufactured and used by or for the Government of the United States of America for governmental purposes without the payment of any royalties thereon or therefor.

BACKGROUND OF THE INVENTION

The present invention relates to the nondestructive testing of the bonding between glass reinforced plastic sections and more particularly pertains to the testing of secondary bonding of stiffeners to a glass reinforced ship hulls. The testing is accomplished in-place and can be repeated during the life of the ship when necessary.

DESCRIPTION OF PRIOR ART

One of the most critical problems confronting developers of ship hulls which are constructed of glass reinforced plastics has been to ascertain the condition of secondary bonds between the various structures. Prior art methods have been confined in the field of nondestructive testing to singular measurements or tests at one or more specific and distinct locations. These prior art devices are further limited in that access must be available to both sides of the area to be test.

SUMMARY OF THE INVENTION

The general purpose of the invention is to provide method and apparatus for the non-destructive evaluation of secondary resin bonding between glass reinforced plastic structures. To attain this, the present invention includes the disposition of a perforated semi-rigid plastic tube with an outer porous paper sleeving internal to the surfaces to be bonded during the initial lay-up. The porous paper sleeve serves to prevent resin infiltration into the tube. The ends of the tube are connected to quick disconnect valves or fittings which extend out of the structure for accessibility. Thereafter air pressure is applied through the valve at one end of the tube. This air ruptures the porous paper at the perforations and any air escaping through the bonded surfaces can be readily detected by a number of means.

An object of the present invention is to provide a simple, inexpensive and reusable structure and apparatus for the non-destructive testing of bonded members.

Another object is to provide a permanent structure for ascertaining the bonding integrity of a glass plastic reinforced ship both during construction and after deployment.

BRIEF DESCRIPTION OF THE DRAWINGS

FIG. 1 is a partial cross-sectional view of a ship constructed of glass reinforced plastic featuring an embodiment of this invention;
FIG. 2 is an enlarged portion of a section of FIG. 1 showing the stiffener member in detail;
FIG. 3 is a view of the stiffener taken approximately along 3—3 of FIG. 2; and,
FIG. 4 is a cross-sectional view of another embodiment made in accordance with the principle of the instant invention.

Other objects and advantages will appear from the following description of an example of the invention, and the novel features will be particularly pointed out in the appended claims.

DESCRIPTION OF THE PREFERRED EMBODIMENTS

The illustrated embodiment of FIG. 1 shows a transverse section of a glass reinforced plastic ship, whose hull 10 and the deck 11 are first formed in the desired contour. The hull is generally fabricated of a glass fiber woven roving with a resin or epoxy matrix which is layed-up on a form. After the hull has completely cured or set, a series of spaced apart longitudinal foam cores 12 are cemented to the hull. These core forms 12 are of a polyurethane, lightweight expanded foam. The readily available unicellular type of urethane foam is preferred in that, for ship application, it can not become water saturated or act as an absorber of any excessive water. The core 12 is provided with a pair of longitudinally extending openings 13 in which are disposed hollow plastic tubes 14 whose walls are apertured or perforated. Over the tube 14 is placed a thin porous paper sleeve 15. Each tube with its sleeve is positioned at the outer edge or corner of the foam core 12 which abuts the hull so that a portion 16 thereof faces outwardly of the core and yet is not therein.

With the foam core thus cemented to the hull a "hat" shaped glass reinforced plastic stiffener 17 is fabricated by laying it up over the foam which serves as a form therefor. The stiffener member, which is of glass reinforced plastic, is laid up "wet" against the dry foam core and cured hull. This is known as a secondary bond. This type of bond is known to be weaker than an equivalent primary ("wet" to "wet") bond and therefore necessitates more careful handling, workmanship and inspection in order to provide the extreme reliability required by the Naval service. In order to provide and maintain reliability under these bonding conditions periodic tests must be conducted to ascertain the condition of the bond between the "hat" shaped stiffener and the hull. To this end the plastic tubes are terminated at their ends or at intermediate points with quick disconnect air valves 18 as shown in FIG. 3. These valves 18 may be affixed to the plastic tube when the tubes are set in with the foam core or they can be attached later by drilling through base or toe of the stiffener into the tube.

An alternate structure for providing a passageway between the core and the stiffener is illustrated in FIG. 4. This arrangement contemplates the disposition of a flexible tubular or solid wire 19 in place of the prior mentioned plastic tube. After the bond surfaces have cured the wire 19 is withdrawn through one end of the stiffener thereby leaving a passageway formed by the matrix resin and the core. With the proper attachment of quick disconnect air valves at selected locations therealong, this passageway serves the same function as the plastic tube.

With either the tube or passageway, source of fluid pressure, which in its simplest form is air, is applied to one of the disconnect air valves so that the entire length of the tube is pressurized. A detector means 20 is moved lengthwise along or proximate the bond at the toe of the stiffener. The detector means may be of numerous varieties such as audio detector (microphone with an amplifier), transducer or strain gauge for measuring stress and deflections as a function of pressure. Of course one of the simplest means would be soapy water applied to the boundaries of the stiffener and then examining this boundary area for bubbles produced by any escaping air from around the stiffener. With regard to the perforated plastic tube, which is partially physically embedded in the resin that bonds the stiffener, it should be borne in mind that the porous paper protects the perforations from being infiltrated by the liquid resin during the lay-up. When sufficient air pressure is applied the porous paper sleeve is ruptured allowing the air to directly contact the resin and escape if the bonding surfaces are not completely and properly joined by the resin.

Summarizing the instant method, which is both direct and repeatable, a passageway is provided proximate the toe area of the stiffener so that it is in communication with the bond surface area between the flanges of the "hat" stiffener and the hull. This passageway can take either the form of a perforated tubular element or the opening formed by the withdrawal of a wire. The passageway is pressurized in a manner aforedescribed and and the escaping of any fluid therefrom is detected by any of the above means.

It should be understood, of course, that the foregoing disclosure relates to only preferred embodiments of the invention and that numerous modifications or alterations may be made therein without departing from the spirit and the scope of the invention.

We claim:

1. In a structure wherein hollow stiffeners, each having oppositely extending flanges, are to be bonded to said structure thereby and formed about a core initially affixed to said structure, that improvement for non-destructively testing the bond therebetween which comprises:
   a tubular element having perforations in the walls thereof,
   a porous paper sleeve positioned about said element,
   said element with said sleeve thereabout disposed lengthwise within said stiffener proximate said flange and said structure,
   a source of fluid pressure,
   means for applying said source of pressure to said element,
   fluid detecting means or ascertaining the presence of escaping fluid about said stiffener,
   whereby bonding defects can be detected when said element is pressurized after the bond has cured by detecting the escaping fluid therefrom.

2. The improvement according to claim 1, wherein said fluid is air.

3. The improvement according to claim 2, wherein said means for applying is a quick disconnect air valve.

4. The improvement according to claim 3, wherein said detecting means is an audio detector.

5. In a glass reinforced plastic ships hull wherein hollow "hat" shaped glass reinforced plastic stiffeners are to be secondarily bonded with a curable liquid resin to said hull and formed about cores initially affixed to said hull apparatus for periodically and non-destructively testing the bond therebetween which comprises:
   a tubular element having perforations in the walls thereof,
   a porous paper sleeve disposed about said element,
   said element and paper disposed lengthwise and internal of said stiffener and communicating with said stiffener at the junction thereof and said hull,
   a source of air pressure,
   an air valve connected between said passageway and said source,
   air detection means for ascertaining the presence of escaping air about said stiffener,
   whereby bonding defects can be readily detected when said passageway is pressurized after the bond resin has cured by detecting the air escaping therefrom.

6. The apparatus according to claim 5, wherein said tubular member is flexible and has, one end thereof extending out of said stiffener which is withdrawn therefrom after said stiffener is bonded to said hull.

References Cited

UNITED STATES PATENTS

| | | | |
|---|---|---|---|
| 2,222,079 | 11/1940 | Larson | 73—37 |
| 2,346,423 | 4/1944 | Gray | 73—40 |
| 2,691,134 | 10/1954 | Ford | 73—40 XR |
| 2,694,924 | 11/1954 | Matlock et al. | 73—37 |
| 2,842,957 | 7/1958 | Bacon | 73—37 |

LOUIS R. PRINCE, Primary Examiner

W. A. HENRY, Assistant Examiner